Patented Feb. 24, 1942

2,274,101

UNITED STATES PATENT OFFICE 2,274,101

BACTERIOSTATIC SUBSTANCE AND PROCESS FOR MAKING THE SAME

Eric G. Snyder, New York, N. Y., assignor to Jovan Laboratories, Inc., New York, N. Y., a corporation of New York No Drawing. Application February 24, 1939, Serial No. 258,175

8 Claims. (Cl. 260—314)

The present invention relates to substances containing four pyrrol nuclei and more particularly to derivatives of the pheophorbides.

It is an object of the present invention to provide a process for making derivatives of chlorin e.

It is another object of the present invention to provide a means for making metallic complexes of chlorin e.

It is a further object of the present invention to provide a process for producing water-soluble salts of metallic complexes of chlorin e.

The present invention also contemplates the use of chlorin e and its derivatives, as bacteriostatic substances.

It is likewise within the contemplation of the present invention to provide bacteriostatic substances containing a metal complex having four pyrrol nuclei.

Other objects and advantages will become apparent to those skilled in the art from the foregoing description.

In general the present invention relates to processes for preparing porphyrins, chlorins and metallic complexes thereof. However, in one aspect the present invention relates to a new process for making the tri-sodium salt or the tri-potassium salt of chlorin e. In addition to other derivatives, such as the copper complex of the tri-methyl ester of chlorine e and its water-soluble derivatives, the tri-sodium salt may be made in accordance with the principles of the present invention.

Chlorophyll is the green pigment found in the chloroplasts of green plants where it is accompanied by carotinoids (carotin, xanthophyll). Two chlorophylls of differing chemical structure are always found together in the chloroplasts of green plants. These chlorophylls are known as chlorophyll a and chlorophyll b. Chlorophyll b differs from chlorophyll a in having a formyl group instead of a methyl group in position 3 of the macrocyclic ring. Thus, chlorophyll a, insofar as its structure is known from the latest and most authentic original researches, is as follows:

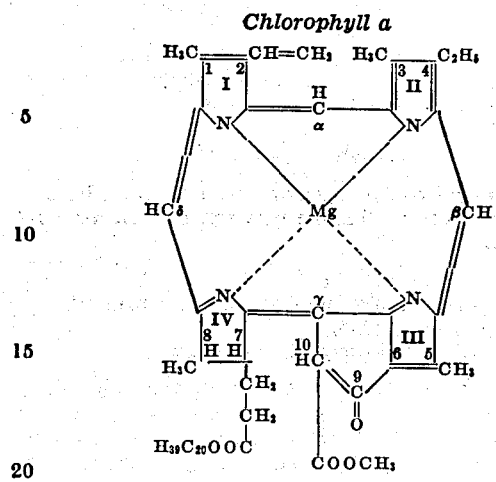

Chlorophyll a

This represents the present state of the knowledge of chlorophyll chemistry. However, further progress of research in chlorophyll chemistry may require some minor changes. In studying the chemistry of chlorophyll compounds, the basic structure of the chlorophyll may be most easily discerned by disregarding the side chains of the chlorophyll molecule. It will be seen from the formula given hereinbefore that four pyrrole rings are bound in their alpha positions to form a macrocyclic ring. It will be easily understood that these four pyrrole rings are joined together by methine groups. The same type of structure, i. e., four pyrrole rings joined at the alpha positions by methine groups to form a macrocyclic ring is found in hemin, the prosthetic group of the blood protein haemoglobin. Hemin may be obtained from the blood protein by splitting off this prosthetic group from the protein part of the haemoglobin molecule. This similarity in structure is the reason why until recently chlorophyll and hemin and other related pigments were included in the larger group of porphyrines or porphins. However, within the last few years it has been recognized that there is a fundamental difference in structure between haemin and related compounds and chlorophyll. The two nuclear hydrogen atoms present in positions 7 and 8 in chlorophyll and green chlorophyll derivatives are absent in haemin, in haemin derivatives and in chlorophyll derivatives having a red color.

It is now generally accepted that all compounds belonging in the general classification and not having the two decisive hydrogen atoms in positions 7 and 8 are classified in the group of porphyrines or porphines. A new group term has been accepted for all compounds belonging in the general classification and having the two decisive hydrogen atoms at positions 7 and 8 in the macrocyclic ring. Such compounds having the two hydrogen atoms at positions 7 and 8 are designated as dihydroporphines or dihydroporphyrines.

In the recently published handbook by Fischer-Stern (page 41) these authorities divide the dihydroporphines into the following two groups:

1. Bodies of the phorbide system

Substances having the two hydrogen atoms in positions 7 and 8 and also having the isocyclic (cyclopentanon) ring on pyrrole nucleus III.

2. Bodies of the chlorine system

Substances having the two hydrogen atoms in postions 7 and 8 but not having the isocyclic (cyclopentanon) ring on pyrrole nucleus III.

Thus we have the following divisions and subdivisions:

1. Porphyrines

Having a double linkage between carbon atoms 7 and 8.

2. Dihydroporphyrines

Having two hydrogens at positions 7 and 8 and having a single linkage between carbon atoms 7 and 8.

(a) Phorbine system:
  Also having the isocyclic ring present.
(b) Chlorine system:
  With the isocyclic ring absent.

Those derivatives of chlorophyll having a formyl group in position 3 are derivatives of chlorophyll b. Those derivatives having a methyl group at position 3 of the macrocyclic ring are derivatives of chlorophyll a. It will be noted from the structural formula A provided hereinbefore, that in chlorophyll there are two esterified carboxyl groups, one on the side chain at position C gamma and the other on the side chain at position 7 in the macrocyclic ring. The side chain at position C gamma being an acetic group at the same time forming part of a cyclopentanon ring, which is often called the "isocyclic ring" of the chlorophyll molecule, and that in position 7 in the macrocyclic ring being a propionic acid group. The acetic acid group is esterified with methanol and the propionic acid group is esterified with phytol in chlorophyll. Saponification and splitting off of the methyl group attached to the acetic acid group at position C gamma is not possible without other simultaneous changes in the structure of the molecule. On the other hand, the phytyl group may be split off and the resulting free acid re-esterified with other alcohols. Those substances in which the propionic acid group at position 7 is a free propionic acid group, or those substances in which the propionic acid group at 7 has been re-esterified with alcohol are designated as chlorophyllids when they contain the magnesium atom in the center of the molecule. The corresponding group term "pheophorbide" includes those substances which are free of magnesium.

By the treatment of chlorophyllides and pheophorbides with strong alkali, a third carboxyl group is formed by the splitting of the isocyclic ring formed by the carbon atoms C gamma, a carbon atom C alpha of pyrrole ring III, the carbon atom 6 of the pyrrole ring III, the carbon atom 10 of the acetic acid group attached at C gamma and the carbon atom C 9. Substances thus obtained are tricarboxylic acids. Such substances obtained from chlorophyllids and containing magnesium are called chlorophyllins a or b. The corresponding substances obtained from pheophorbides and free of magnesium are called phytochlorins or, for brevity, chlorins if derived from pheophorbide a. The corresponding substances derived from pheophorbide b are designated as phytorhodines or, for brevity, rhodins. Depending on the conditions under which the saponification with alkali takes place, different chlorophyllins, phytochlorins and phytorhodins are formed. Hot saponification produces products different from those obtained by cold saponification. Mixtures of saponification products are obtained when conditions during the saponification are intermediate between hot and cold. The products obtained by hot saponification (boiling) of chlorophyllids are called isochlorophyllins a or b, depending upon whether the mother substance is a chlorophyllid a or b. Cold saponification gives chlorophyllin a or b in the restricted sense or more often mixtures of chlorophyllins and isochlorophyllins.

The products obtained by hot saponification (boiling) of pheophorbides are:

1. From pheophorbides a is obtained phytochlorine-e-6 (the index numbers giving the number of oxygen atoms), also called chlorin-e-6 or, for brevity, chlorin e or phytochlorin e.

2. From pheophorbides b, is obtained phytorhodin-g-7, also called rhodin-g-7, or, for brevity, rhodin g or phytorhodin g (also spelled phytorhodine).

It will be recognized that phytochlorin-e-6 and phytorhodin-g-7 are the magnesium-free substances corresponding to isochlorophyllin a and isochlorophyllin b, and may be obtained from these isochlorophyllins by elimination of magnesium with acid.

Cold saponification of pheophorbides also gives mixtures of several phytochlorins (from pheophorbides a), and several phytorhodins (from pheophorbides b). These mixtures consist of phytochlorin-e-6, and other, so-called weakly basic phytochlorins, as phytochlorin f and g, and phytorhodin-g-7 and other, so-called weakly basic phytorhodins as phytorhodin i and k.

(If cold saponification is carried out in the usual way, that is, by shaking out solutions of pheophorbides in ether or other suitable solvents with alkaline solutions, no phytochlorin e or phytorhodin g at all are formed but only the weakly basic substances phytochlorin g and phytorhodin k.)

The weakly basic phytochlorins may be obtained by elimination of magnesium from chlorophyllin a, and the weakly basic phytorhodins may be obtained by elimination of the magnesium from chlorophyllin b. However, these weakly basic phytorhodins and phytochlorins can not be obtained from the corresponding isochlorophyllins. These weakly basic chlorins and rhodins are very unstable and subject to chemical change. For these reasons, these weakly basic chlorins and rhodins, such as phytochlorin *f* and *g* and phytorhodin *i* and *k* are undesirable substances. The reason that cold saponification gives substances different from those obtained by hot saponification is that during cold saponification, an oxidation takes place in the C 10 position, changing the atomic group in position 10 from

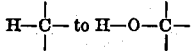

This oxidation has been called allomerization of chlorophyll or chlorophyll derivatives. It may also take place independent of saponification, all allomerized chlorophyllids giving chlorophyllins, not isochlorophyllins, and all allomerized pheophorbides giving weakly basic phytochlorins and phytorhodins on saponification, not phytochlorin *e* and phytorhodin *g*, whether saponification is hot or cold.

The tri-sodium or tri-potassium salt of chlorin *e* may be made in accordance with the principles of the present invention from pheophorbides *a*, for example, from pheophytin *a*. Thus, one part by weight of commercially pure pheophytine *a* is added to ten parts by weight of a concentrated solution, preferably a saturated solution, of sodium hydroxide in 98% methyl alcohol. The mixture or suspension is boiled under a reflux condenser for several hours, preferably about 7 hours. During the reaction period it is preferable to exclude the carbon dioxide of the air by any suitable means, such as a soda lime seal. The refluxed mixture is allowed to cool and stand for a period of several hours, say about 12 hours, preferably at a temperature of about 10° C. or less, during which time the sodium salt of chlorin *e* is precipitated. The precipitate is separated from the liquid phase by filtration or centrifuging or decantation and the solid material washed, substantially free of alkali with absolute alcohol, then with ether and finally dried preferably in a vacuum.

The tri-potassium salt may be made in a similar manner by adding one part of substantially pure pheophytin *a* to ten parts of a solution of potassium hydroxide in methyl alcohol. The potassium hydroxide solution may be made by dissolving one part by weight of potassium hydroxide in five parts by weight of 98% methyl alcohol. Concentrations as low as about 12% KOH and as high as about 30% KOH may be employed. The caustic methyl alcohol suspension of pheophytin is boiled under a reflux condenser for several hours, say about 5 hours, during which time it is preferred to exclude the carbon dioxide of the air in any suitable manner. After the refluxing operation is completed the reaction mass is allowed to cool and stand until the potassium salt of chlorin *e* is precipitated out. Usually 12 hours is sufficient. The precipitated potassium salt is separated from the liquid phase in any suitable manner, such as by filtration or centrifuging and washed substantially free of alkali with absolute ethyl alcohol and ether or any other solvent suitable to remove alcohol and readily volatile in vacuum, preferably, the potassium salt substantially devoid of free alkali is dried in a vacuum.

As illustrative of the process for making copper, silver and mercury complexes of chlorin *e* the following flow sheet will be of assistance to those skilled in the art.

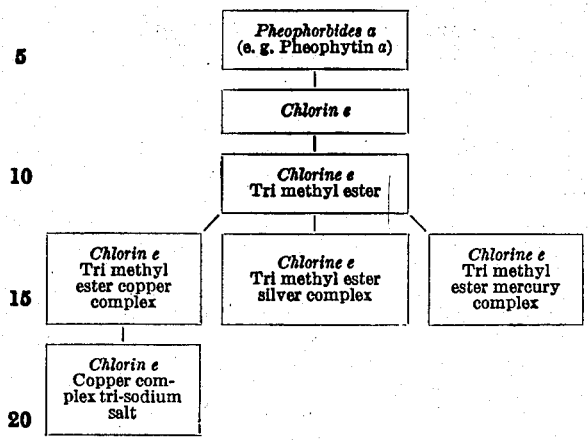

In accordance with this flow sheet a pheophorbide *a*, such as pheophytin *a* is treated according to the method described by Willstaetter and his collaborators and given for example in Abdehalden, E., Handbuch der biologischen Arbeitsmethoden, Abt. I, Teil II, to produce chlorin *e*. Chlorin *e* in turn is treated either in accordance with the method of Treibs and Wiedemann, (Liebigs Annalen der Chemie, Vol. 471, p. 147) using diazomethane or the Willstaetter method using dimethyl sulfate (Willstaetter, R., and Stoll, A., Untersuchungen ueber Chlorophyll, Berlin 1913, page 299), and the tri methyl ester of chlorin *e* obtained. Upon treating the chlorin *e* tri methyl ester in accordance with the method of Willstaetter (Willstaetter, R., and Stoll, A., Untersuchungen ueber Chlorophyll, Berlin, 1913) the copper complex of the tri methyl ester of chlorin *e* is obtained.

In accordance with the principles of the present invention the copper complex of chlorin *e* can be obtained in a soluble form as the tri sodium salt thereof by hydrolyzing the tri methyl ester with a methyl alcohol solution of sodium hydroxide. Thus, the copper complex of the tri methyl ester chlorin *e* is suspended in an excess of one normal methyl alcohol solution of sodium hydroxide. The suspension is refluxed for a short time, say about 15 minutes or until the copper complex has dissolved completely. Water is added to the solution and the mixture refluxed for a time, say about 3 hours. While the amount of water added to the methyl alcohol solution of the copper complex is not important it should be at least sufficient to keep the tri sodium salt in solution. From an economical standpoint the quantity should be kept as low as possible, say about ½ part of water to one part of solution, since the use of larger amounts of water will involve the use of greater amounts of precipitating agent when it is desired to precipitate out the sodium salt. After the water-methyl alcohol solution has been refluxed for, say, about 3 hours the tri sodium salt formed is precipitated by adding approximately 5 parts of absolute ethyl alcohol or similar precipitating agent to one part of solution. The mixture preferably is then chilled to say below 10° C. and allowed to stand until the precipitate of the tri-sodium salt of the copper complex of chlorin *e* precipitates. The precipitate is separated by filtration or otherwise, dissolved in a methyl alcohol-water solution and reprecipitated with absolute ethyl alcohol. Of course, it is to be redissolved and appreciated that the tri-sodium salt can be reprecipitated as often as necessary to obtain a product of desired purity.

The preparation of the silver complex of the chlorin e tri methyl ester is carried out in a slightly different manner. The tri methyl ester of chlorin e is dissolved in chloroform and an equal volume of 95% methyl alcohol saturated with silver acetate added thereto. In addition solid silver acetate is introduced into the solution of tri methyl ester and methyl alcohol. The reaction mixture may be kept at room temperature and the silver complex formed by allowing the reaction mixture to stand with occasional shaking. The completion of the reaction is assured when the mixture no longer shows any fluorescence. When the reaction is complete a volume of ether, or other inert solvent in which the compound is only slightly soluble or preferably insoluble, equal to that of the reaction mass is added to the solution and the excess of silver acetate washed out with water. For example, benzol, carbon tetrachloride or petroleum ether may be used in place of ether. A suitable means for this operation is the well known separatory funnel or its equivalent. At the time when the silver acetate is washed out most of the methyl alcohol is likewise removed. The residual ether-chloroform solution is dried, for example, with anhydrous potassium carbonate and concentrated in a vacuum. The silver complex of tri methyl ester of chlorin e crystallizes from the concentrated solution better when kept at a temperature below 10° C. The crystals are separated from the mother liquor by filtration or centrifuging or any suitable manipulation, washed with methyl alcohol and ether and dried in a vacuum.

The mercury complex of the tri methyl ester of chlorin e is made in a manner somewhat similar to that employed in the preparation of the silver complex. That is, the tri-methyl ester of chlorin e is dissolved in chloroform and an excess of a solution of mercuric acetate in chloroform added. The resulting solution is refluxed until fluorescence disappears at which time the reaction is complete. Refluxing the solution for about 30 minutes is usually sufficient for the completion of the reaction. After the reaction has reached completion a volume of ether or other inert solvent equal to that of the reaction solution is added and the excess of mercuric acetate washed out with water. The residual solution of the mercury complex is dried for example with anhydrous potassium carbonate and concentrated in a vacuum. The mercury complex of tri methyl ester of chlorin e crystallizes from the concentrated solution better when kept at a temperature below about 10° C.

Investigations now being carried on indicate that chlorin e and derivatives thereof such as have been described hereinabove have very interesting bacteriostatic properties. In fact it would appear that in the usual culture medium the life processes of the tubercle bacilli are accelerated in the first generation and the growth of the organism appears to be stopped in the second generation. Further confirmation of this and its relation to the use of these and similar complexes having four pyrrol nuclei as bacteriostatic substances is being investigated.

Although the present invention has been described in conjunction with certain preferred embodiments it is to be understood that variations and modifications may be made as those skilled in the art will readily understand. Thus, where the methyl ester is described it is to be understood that the ethyl ester may also be used. Such variations and modifications are to be considered within the purview of the specification and the scope of the appended claims. Furthermore, the following tabulation is given in order to provide the descriptive names for the chlorophyll derivatives mentioned hereinbefore in accordance with the nomenclature of the Geneva Convention:

Chlorophyll a=magnesium complex of 1,3,5,8-tetramethyl-4-ethyl-2-vinyl-9-oxo - 10 - carbmethoxy-phorbine - 7 - propionic acid phytyl ester Chlorphyll b=magnesium complex of 1,5,8-trimethyl-4-ethyl-2-vinyl-3-formyl-9-oxo-10 - carbmethoxy-phorbine-7-propionic acid phytyl ester Methyl chlorophyllid a=magnesium complex of 1,3,5,8-tetramethyl-4-ethyl-2-vinyl-9-oxo - 10 - carbmethoxy-phorbine-7-propionic acid methyl ester Methyl chlorophyllid b=magnesium complex of 1,5,8-trimethyl-4-ethyl-2-vinyl-3-formyl - 9 - oxo-10-carbmethoxy-phorbine-7-propionic acid methyl ester Ethyl chlorophyllid a=magnesium complex of 1,3,5,8-tetramethyl-4-ethyl-2-vinyl-9 - oxo-10-carbmethoxy-phorbine-7-propionic acid ethyl ester Ethyl chlorophyllid b=magnesium complex of 1,5,8-trimethyl-4-ethyl-2-vinyl-3-formyl - 9 - oxo-10-carbmethoxy - phorbine - 7 - propionic acid ethyl ester Free chlorophyllid a = magnesium complex of 1,3,5,8 tetramethyl - 4 - ethyl - 2 - vinyl-9-oxo-10-carbmethoxy-phorbine-7-propionic acid Free chlorophyllid b=magnesium complex of 1,5,8-trimethyl-4-ethyl-2-vinyl-3-formyl - 9 - oxo-10-carbmethoxy-phorbine - 7 - propionic acid Phytyl pheophorbide a = pheophytin a = 1,3,5,8-tetramethyl-4-ethyl-2-vinyl-9-oxo-10 - carbmethoxy-phorbine - 7 - propionic acid phytyl ester Phytyl pheophorbide b=pheophytin b=1,5,8-trimethyl-4-ethyl-2-vinyl-3-formyl-9-oxo - 10-carbmethoxy-phorbine-7-propionic acid phytyl ester Methyl pheophorbide a=1,3,5,8 - tetramethyl-4-ethyl-2-vinyl-9 - oxo - 10 - carbmethoxy - phorbine-7-propionic acid methyl ester Methyl pheophorbide b=1,5,8-trimethyl-4-ethyl-2-vinyl - 3 - formyl - 9 - oxo-10-carbmethoxy-phorbine-7-propionic acid methyl ester Ethyl pheophorbide a=1,3,5,8-tetramethyl - 4 - ethyl-2-vinyl-9-oxo-10-carbmethoxy - phorbine-7-propionic acid ethyl ester Ethyl pheophorbide b=1,5,8-trimethyl-4-ethyl-2-vinyl-3-formyl-9-oxo-10-carbmethoxy-phorbine-7-propionic acid ethyl ester Free pheophorbide a=pheophoride a=1,3,5,8-tetramethyl-4-ethyl-2-vinyl-9-oxo - 10 - carbmethoxy-phorbine-7-propionic acid Free pheophorbide b=pheophorbide b=1,5,8-trimethyl-4-ethyl-2-vinyl-3-formyl - 9 - oxo-10-carbmethoxy-phorbine-7-propionic acid Phytochlorin e=phytochlorin e-6=1,3,5,8-tetramethyl-4-ethyl-2-vinyl-chlorine-6 - carbonic acid-gamma-acetic acid-7-propionic acid.

Phytorhodin g = phytorhodin - g - 7 =1,5,8 - trimethyl-4-ethyl-2-vinyl-3-formyl-chlorine - 6 - carbonic acid-gamma-acetic acid-7-propionic acid Isochlorophyllin $a$=magnesium complex of 1,3,5,8-tetramethyl-4-ethyl-2-vinyl-chlorine-6-carbonic acid-gamma-acetic acid-7-propionic acid Isochlorophyllin $b$=magnesium complex of 1,5,8-trimethyl-4-ethyl-2-vinyl-3-formyl-chlorine-6-carbonic acid-gamma-acetic acid-7-propionic acid Phytochlorin-$f$=1,3,5,8-tetramethyl-4-ethyl-2-vinyl-chlorine-6-carbonic acid-7-propionic acid Trimethyl ester of phytochlorine $e$=1,3,5,8-tetramethyl-4-ethyl-2-vinyl-chlorine-6-carbonic acid-gamma-acetic acid-7-propionic acid trimethyl ester Copper complex of tri-methyl ester of phytochlorin $e$=copper complex of 1,3,5,8-tetramethyl-4-ethyl-2-vinyl-chlorine-6-carbonic acid-gamma-acetic acid-7-propionic acid trimethyl ester Tri-sodium salt of copper complex of phytochlorin $e$=copper complex 1,3,5,8-tetramethyl-4-ethyl-2-vinyl-chlorine-6-carbonic acid-gamma-acetic acid-7-propionic acid tri-sodium salt

I claim:

1. A process for making a water-soluble copper complex of phytochlorin $e$ which comprises dissolving a copper complex of tri methyl ester of phytochlorin $e$ in an excess of methyl alcohol solution of sodium hydroxide, adding sufficient water to keep the sodium salt to be formed therein in solution and to form a reaction mixture, refluxing said reaction mixture until the reaction is substantially complete to form a sodium salt of a copper complex of phytochlorin $e$, adding a precipitating agent to precipitate the sodium salt thus formed, separating the precipitated sodium salt from the reaction mixture, dissolving the separated sodium salt in a solvent therefor and reprecipitating said sodium salt whereby a water-soluble sodium salt of the copper complex of phytochlorin $e$ is obtained.

2. A process for making a water-soluble copper complex of phytochlorin $e$ which comprises refluxing a reaction mixture comprising a solution of a copper complex of a tri methyl ester of phytochlorin $e$ in an excess of methyl alcohol solution of sodium hydroxide in the presence of at least sufficient water to keep the sodium salt to be formed therein in solution until the reaction is substantially complete to form a sodium salt of a copper complex of phytochlorin $e$, precipitating said sodium salt, and separating said sodium salt from the reaction mixture whereby a soluble sodium salt of a copper complex of phytochlorin $e$ is obtained.

3. A process for making a water-soluble copper complex of phytochlorin $e$ which comprises forming a suspension of a tri methyl ester of the copper complex of phytochlorin $e$ in an excess of one normal methyl alcohol solution of sodium hydroxide, refluxing said suspension for a short time until the copper complex has dissolved completely, adding water to said refluxed suspension to form a reaction mixture in which the sodium salt of a copper complex of phytochlorin $e$ to be formed is substantially soluble, refluxing said reaction mixture until the reaction is practically complete to form a tri-sodium salt of said copper complex, adding sufficient ethyl alcohol to precipitate said sodium salt of said copper complex, allowing said reaction mixture to stand until said sodium salt precipitates, separating said precipitate from the reaction mixture, and purifying said sodium salt by solution and reprecipitation until a sodium salt of desired purity is obtained whereby a water-soluble sodium salt of the copper complex of phytochlorin $e$ is obtained.

4. A process for making a water-soluble copper complex of phytochlorin $e$ which comprises establishing a solution of a copper complex of a tri methyl ester of phytochlorin $e$ in an excess of one normal methyl alcohol solution of sodium hydroxide, adding water to said solution in the ratio of 0.5 part of water to 1 part of solution to form a reaction mixture, refluxing said reaction mixture for about 3 hours to form the tri-sodium salt of a copper complex of phytochlorin $e$, adding approximately 5 parts of absolute ethyl alcohol to the aforesaid refluxed reaction mixture to precipitate said tri-sodium salt of a copper complex of phytochlorin $e$, chilling the reaction mixture to a temperature of at least 10° C. and allowing the chilled reaction mixture to stand until the precipitation of the tri-sodium salt of the copper complex of phytochlorin $e$ is substantially complete, separating said precipitate of the tri-sodium salt of the copper complex of phytochlorin $e$ from the reaction mixture, dissolving said precipitate in a methyl alcohol-water solution and reprecipitating purified tri-sodium salt of the copper complex of phytochlorin $e$ by the addition of absolute ethyl alcohol whereby purified tri-sodium salt of a copper complex of phytochlorin $e$ is obtained.

5. A process for making a water-soluble copper complex of phytochlorin $e$ which comprises refluxing a reaction mixture comprising the copper complex of the tri methyl ester of phytochlorin $e$, an excess of one normal methyl alcohol solution of sodium hydroxide and sufficient water to keep the sodium salt of the copper complex of phytochlorin $e$ to be formed in solution for a period of time until the reaction to form the tri-sodium complex of phytochlorin $e$ is practically complete, adding absolute ethyl alcohol to precipitate at least a portion of the tri-sodium salt of a copper complex of phytochlorin $e$, chilling the reaction mixture containing said at least partially precipitated tri-sodium salt of a copper complex of phytochlorin $e$ to a temperature of at least 10° C. to practically complete the precipitation of the tri-sodium salt of a copper complex of phytochlorin $e$ formed as aforesaid, separating said precipitated tri-sodium salt of a copper complex of phytochlorin $e$ from said reaction mixture, and purifying said tri-sodium salt of a copper complex of phytochlorin $e$ by solution in a suitable solvent and reprecipitation whereby a purified tri-sodium salt of a copper complex of phytochlorin $e$ is obtained.

6. A process for making a water-soluble copper complex of phytochlorin $e$ which comprises establishing a reaction mixture containing the tri methyl ester of a copper complex of phytochlorin $e$, an excess of one normal methyl alcohol solution of sodium hydroxide and sufficient water to keep the tri-sodium salt of a copper complex of phytochlorin $e$ to be formed in solution, refluxing said reaction mixture for a period of time sufficient to practically complete the reaction to form the tri-sodium salt of a copper complex of phytochlorin $e$, adding a precipitating agent and chilling said reaction mixture containing said precipitating agent to at least 10° C. to practically complete the precipitation of said tri-sodium salt of a copper complex of phytochlorin e, and separating said tri-sodium salt of a copper complex of phytochlorin e from said reaction mixture.

7. A process for making a water-soluble copper complex of phytochlorin e which comprises forming a suspension of the tri methyl ester of the copper complex of phytochlorin e in an excess of one normal methyl alcohol solution of sodium hydroxide, refluxing the suspension for about 15 minutes, adding an amount of water equivalent by volume to about one half of the volume of said suspension to form a reaction mixture, refluxing said reaction mixture for about 3 hours to form the tri-sodium salt of the copper complex of phytochlorin e, adding an amount of absolute ethyl alcohol to said refluxed reaction mixture in the proportion of about 5 parts of absolute ethyl alcohol to one part of reaction mixture to initiate the precipitation of the tri-sodium salt of the copper complex of phytochlorin e, cooling the reaction mixture containing precipitated tri-sodium salt of the copper complex of phytochlorin e to below 10° C., allowing said cooled mixture to stand until the precipitation of the tri-sodium salt of the copper complex of phytochlorin e is substantially complete, separating said precipitate containing the tri-sodium salt of the copper complex of phytochlorin e, dissolving said precipitate in a methyl alcohol-water solution to form a solution containing the tri-sodium salt of the copper complex of phytochlorin e, and adding absolute ethyl alcohol to said methyl alcohol-water solution containing the tri-sodium salt of the copper complex of phytochlorin e to precipitate the tri-sodium salt of the copper complex of phytochlorin e in a purified state.

8. As a new composition of matter, a water-soluble sodium salt of a copper complex of phytochlorin e.

ERIC G. SNYDER.